US007843650B1

(12) United States Patent
Roberts

(10) Patent No.: US 7,843,650 B1
(45) Date of Patent: Nov. 30, 2010

(54) MONOLITHIC AFOCAL TELESCOPE

(75) Inventor: William T. Roberts, Glendale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 43 days.

(21) Appl. No.: 12/490,422

(22) Filed: Jun. 24, 2009

Related U.S. Application Data

(60) Provisional application No. 61/133,092, filed on Jun. 25, 2008.

(51) Int. Cl.
*G02B 13/00* (2006.01)
*G02B 13/08* (2006.01)
(52) U.S. Cl. .................................. 359/744; 359/712
(58) Field of Classification Search ................ 359/642, 359/708, 712, 726, 727, 728, 732, 744
See application file for complete search history.

(56) References Cited

U.S. PATENT DOCUMENTS

| | | | | |
|---|---|---|---|---|
| 3,811,749 | A * | 5/1974 | Abel | 359/365 |
| 5,654,831 | A * | 8/1997 | Byren et al. | 359/718 |
| 5,973,858 | A * | 10/1999 | Sekita | 359/729 |
| 2010/0091396 | A1* | 4/2010 | Hutson et al. | 359/859 |

OTHER PUBLICATIONS

Devany, Optical design for two telescopes, Applied Optics, Feb. 1963, vol. 2, Issue 2, p. 201.
Smith, Warren J., Modern Lens Design: a resource manual, McGraw-Hill Professional I 1992, pp. 295-296.

* cited by examiner

Primary Examiner—David N Spector
(74) Attorney, Agent, or Firm—Mark Homer

(57) ABSTRACT

An afocal monolithic optical element formed of a shallow cylinder of optical material (glass, polymer, etc.) with fast aspheric surfaces, nominally confocal paraboloids, configured on the front and back surfaces. The front surface is substantially planar, and this lends itself to deposition of multi-layer stacks of thin dielectric and metal films to create a filter for rejecting out-of-band light. However, an aspheric section (for example, a paraboloid) can either be ground into a small area of this surface (for a Cassegrain-type telescope) or attached to the planar surface (for a Gregorian-type telescope). This aspheric section of the surface is then silvered to create the telescope's secondary mirror. The rear surface of the cylinder is figured into a steep, convex asphere (again, a paraboloid in the examples), and also made reflective to form the telescope's primary mirror. A small section of the rear surface (approximately the size of the secondary obscuration, depending on the required field of the telescope) is ground flat to provide an unpowered surface through which the collimated light beam can exit the optical element. This portion of the rear surface is made to transmit the light concentrated by the reflective surfaces, and can support the deposition of a spectral filter.

24 Claims, 4 Drawing Sheets

MONOLITHIC AFOCAL TELESCOPE

CROSS-REFERENCE TO RELATED APPLICATIONS

The present application derives priority from U.S. Provisional Application No. 61/133,092, filed 25 Jun. 2008.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to optical imaging and, more particularly to an afocal optical lens formed of transmissive optical material (glass, polymer, etc.) with confocal paraboloids on the front and back surfaces and used to create a compact, lightweight, permanently-aligned, aberration-free afocal telescope.

b. Background of the Invention

Interplanetary communications systems can benefit significantly from the introduction of free-space optical communications systems in which pulses of light are used to encode data for the long journey back to Earth. Such optical systems have demonstrated their potential to increase data transmission rates by orders of magnitude compared to more traditional RF systems of similar mass and power. However, to succeed at this, the optical communications systems require high-quality telescopes of about 20-50 cm diameter to expand their beams, generating more concentration of pulse energy (and hence more efficient collection of that energy) at the receiver on Earth. The extreme conditions of the space launch environment make the development and alignment of such a telescope difficult. This is due to thermal excursions as the telescope moves in and out of planetary shadows, and the violent shaking of the telescope during launch, both of which are serious impediments to maintaining alignment of the various optical surfaces in the telescope. The consequences of such a misalignment are that the signal can be mis-directed away from the Earth-bound receiver system, or aberrated enough to spread the light out at the receiver and prevent detection, tracking and decoding of the interplanetary signal. As a result, telescopes intended for launch to space require stiff, heavy structural members to maintain alignment, and may employ active metering and control systems to center and precisely position the optical elements for optimal performance. These structural elements add significant dead weight to the instrument, and consume precious resources during design and testing their effectiveness and maintaining the integrity and alignment of the optical system through the harsh thermal, decompression, vibrational and mechanical shock environments encountered in a space-qualified system.

Frequently, optical instruments employ afocal telescopes (in which the final output beam from a distant source is neither converging nor diverging) to expand or compress the sizes of incoming signals or emitted laser beams in order to deal with them more easily. Compressing a beam allows subsequent beam-shaping and directing optics to be smaller, generating a savings in system weight and consumed volume. Additionally, the optical beam compression is inversely proportional to the system's angular magnification, allowing a low-resolution beam steering element to be used for more precise centering of the image. Traditional afocal telescope systems frequently include a front-surface primary mirror with a concave surface curved to exact shape, and a separate convex front-surface secondary mirror, designed to collimate the light from a distant point source.

Monolithic telescopes have been built, in which curved surfaces are figured onto the front and back sides of glass cylinders. See, "Optical Design for Two Telescopes" by Arthur S. DeVany, Applied Optics, p. 201 (February 1963). However, this design used spherical surfaces which severely limits its useful focal ratio. Moreover, it was not well corrected for aberrations, and was far too massive to be practical as a rugged space-based instrument.

For expansion or concentration of laser beams or narrow field-of-view optical systems, systems of nested confocal paraboloids are well known to have excellent imaging characteristics. Two on-axis confocal paraboloidal mirrors (a large concave reflector paired with a smaller convex reflector) can deliver a collimated beam of reduced diameter onto a curved Petzval surface. Such a system furthermore corrects for all primary (3rd order Seidel and chromatic) aberrations. See, Modern Lens Design by Warren J. Smith, pp. 295-296. However, previous beam expander designs use at least two discrete elements to generate the compression or expansion, and are quite sensitive to misalignment of the lens components from thermal changes or mechanical mistreatment. Thus, there remains a need for an afocal optical communications telescope which is lightweight and rugged, operates across a wide wavelength range, provides excellent stigmatic imaging, and is insensitive to thermal changes.

Disclosed herein is an afocal monolithic optical element formed of transmissive optical material (glass, polymer, etc.) into which confocal reflecting paraboloids are figured on the front and back surfaces to create an aberration-free afocal telescope. The combination of two highly-configured confocal paraboloids on opposite sides of a single piece of glass allows for correction of all primary aberrations, and opens their aberration-free use to the full optical, UV and IR spectrum of light.

SUMMARY OF THE INVENTION

It is, therefore, an object of the present invention to provide an afocal optical element formed of a monolithic block of optical material According to the present invention, the above-described and other objectives are accomplished by providing an afocal monolithic optical element formed of a shallow cylinder of optical material (glass, polymer, etc.) with fast (steeply-curved) aspheric surfaces (nominally confocal paraboloids) configured on the front and back surfaces. The first surface is substantially planar, which lends itself to deposition of multilayer stacks of thin dielectric and/or metal films to create a filter for rejecting undesirable out-of-band light. However, an aspheric section (for example, a paraboloid) is figured into a small area of this surface (for a Cassegrain-type telescope) or possibly attached to the planar surface (for a Gregorian-type telescope). This aspheric section of the surface is then silvered to create the telescope's secondary mirror. The opposing surface of the cylinder is figured into a steeply-curved, convex asphere (again, in the example shown, a paraboloid). A small section of this opposing surface, approximately the size of the secondary obscuration, is ground flat to provide an unpowered surface through which the collimated light beam can exit the optical system. A highly reflective coating (e.g. a multi-layer dielectric reflector or protected silver coating) is applied to the curved portion of this second surface so that light travelling through the optical material of which it is made is internally reflected from this surface toward the curved portion of the first surface. In this way, the curved portion of the second surface becomes the telescope's primary mirror, while the curved portion of the first surface becomes the telescope's secondary mirror.

DETAILED DESCRIPTION OF THE PREFERRED EMBODIMENT

The present invention is an afocal optical element formed of a monolithic block of optical material (glass, polymer, or other suitable transmissive material).

Figure 1:
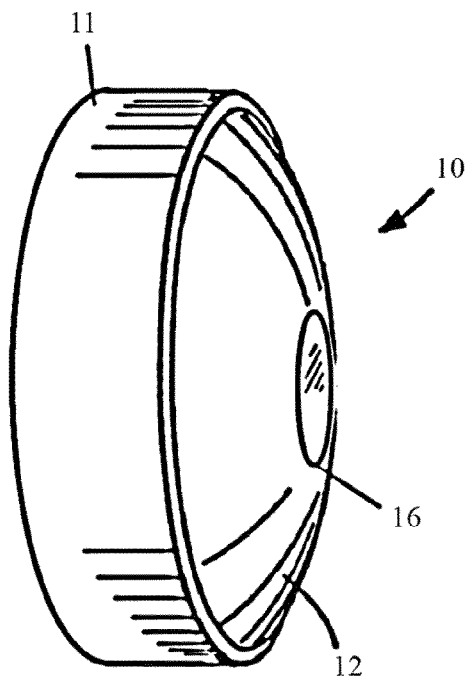
FIG. 1 is a front perspective view of a Cassegrainian-type afocal monolithic optical element with a beam-reduction factor of 10 according to an embodiment of the invention.
Figure 2:
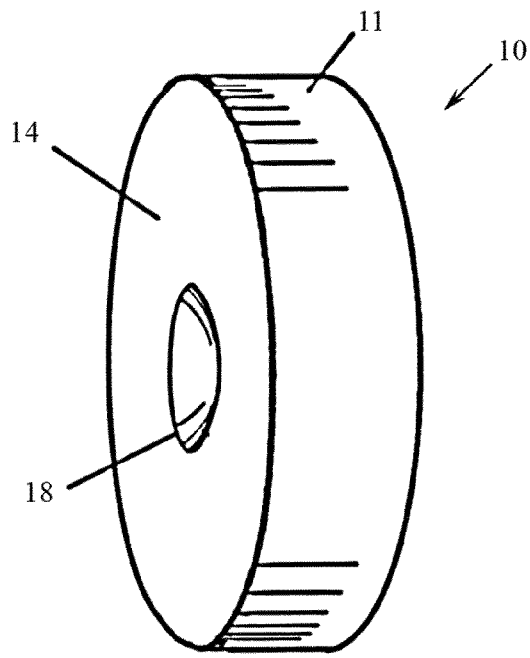
FIG. 2 is a rear view of the afocal monolithic optical element of FIG. 1.

FIG. 1 is a front perspective view of an afocal optical element 10 configured as a Cassegrainian-type lens according to an embodiment of the invention, and FIG. 2 is a rear view. The element 10 is formed from a shallow cylinder with steeply-curved aspheric surfaces (preferably confocal paraboloids) configured on the front and rear surfaces 14, 12, respectively.

The front surface 14 is substantially planar, which allows it to support the deposition of multi-layer stacks of thin dielectric and metal films to create a filter for rejecting out-of-band light. However, an aspheric section 18 (in this embodiment a paraboloid) is either ground into a small area of the planar front surface 14 (for a Cassegrainian-type telescope) or is attached to the front surface 14 (for a Gregorian-type telescope). Both of these exemplary telescope configurations are described below. The aspheric section 18 on the front surface 14 is preferably formed at the center, and is coated (e.g. "silvered") to function as a telescope secondary mirror. The coating may be any suitable coating for reflecting at least the wavelengths of interest, either reflecting, transmitting or absorbing other wavelengths, and may be a spectrally selective filter. Specifically, the coating may be any from among the group of protected silver coatings, and multilayer dielectric reflective coatings including wavelength specific electron beam multilayer dielectric reflective coatings that reflect the desired narrow-band of light travelling through the optical material. The coating may be formed by any known coating process, by deposition of one or more dielectric and metallic films, or by attachment of a separate reflective layer or spectrally selective filter. The remainder of the front surface 14 (not the aspheric section 18) is polished and optically transmissive for at least the wavelengths of interest in order to function as an entrance aperture. One skilled in the art will readily understand that the remainder of the front surface 14 may be left uncoated, or may be coated with a filter for excluding undesirable wavelengths of light. This coating may be any suitable filter coating for passing at least the wavelengths of interest, and either reflecting, transmitting or absorbing other wavelengths. Specifically, the coating may be any from among the group of colored dye coatings or multi layer dielectric bandpass or cut-on filters, including wavelength specific electron beam multilayer dielectric reflective coatings that transmit a desired narrow-band of light into the optical material. Again, this coating may be formed by any known coating process including dye-coating and/or deposition of one or more dielectric and metallic films, or by attachment of a separate filter layer or spectrally selective filter. It is noteworthy that the flat front surface 14 around the aspheric section 18 lends itself to convenient deposition of filter layer (s).

The rear surface 12 of the lens 10 is configured substantially into a steep, convex asphere (again, in this embodiment a paraboloid). A small section 16 of this opposing surface (approximately the size of the secondary obscuration 18, depending on the required field of the telescope) is ground flat to provide an unpowered surface through which the collimated light beam can exit the optical element. The rear surface 12 of the lens 10 (hut not the flat section 16) is coated as above with a suitable coating for inwardly reflecting at least the wavelengths of interest (e,g, protected silver coating or multilayer dielectric reflective coating).

The entire optical element may be formed from a single piece of transmissive material (e.g. glass, fused silica, or optical polymers such as Lexan™ or polymethyl methacrylate (PMMA)) to form a complete afocal telescope.

Figure 3:
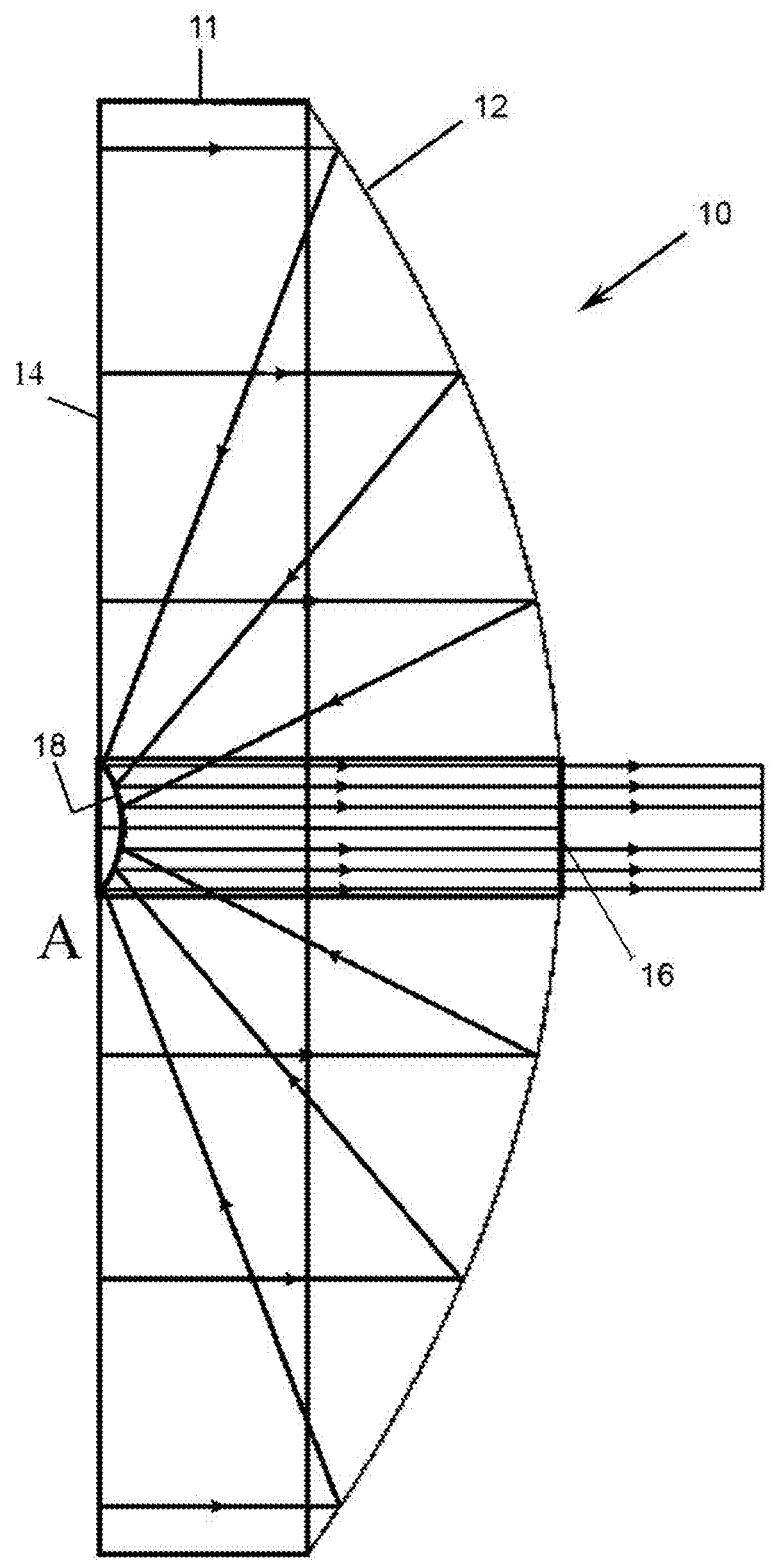
FIG. 3 is a diagrammatic view of the Cassegraining-type afocal monolithic optical element illustrating its operation.

FIG. 3 is a diagrammatic view of the Cassegrainian-type optical element 10 illustrating its operation. Given the configuration shown in FIGS. 1-2, the system is envisioned with confocal paraboloids figured into opposite sides of the cylinder of optical material. Most of the front surface 14 of the element 10 (through which light enters as at A) is flat, and thus has no effect on parallel rays entering the element at A. Again, this makes the front surface 14 an ideal surface for the deposition of thin-film filters for heat and/or background light rejection, and such is considered to be within the scope and spirit of the invention. The secondary obscuration 18 comprises a small portion of this surface, sized in accordance with the overall telescope parameters, and this is preferably positioned at the center of the front surface 14. The secondary obscuration 18 is figured into a paraboloid with an aspheric surface opening in the direction opposite to the incoming light A. The secondary obscuration 18 may be formed by grinding the aspheric shape as a concave depression in the front surface 14. The figured asphere secondary obscuration 18 is silvered as described above, thereby forming the secondary mirror of the monolithic telescope. This effectively forms a Cassegrainian-type telescope with an optically positive primary mirror and negative secondary mirror.

The opposing rear surface 12 of the lens 10 is shaped substantially into a convex aspheric surface, in this case, another paraboloid. This parabloloid has a focus at or near the focus of the previously-mentioned secondary obscuration 18. The opposing rear surface 12 of the lens 10 is also silvered as above to provide good reflective properties across the ultraviolet, visible and infrared portions of the optical spectrum. Again, a small section 16 of this rear surface 12, preferably centered on the axis of symmetry, is polished flat and is not silvered to thereby provide an exit surface for the concentrated beam. As with the front surface 14, the flat section 16 provides an ideal surface for the deposition of thin-film filters, and particularly a narrow notch-transmission filter for background rejection, and such is considered to be within the scope and spirit of the invention. The concentrated beam is transmitted through flat section 16 and may be further resolved/focused to form an image. One skilled in the art will realize that the above-described design of the optical element provides an afocal optical telescope formed from a single piece of transmissive optical material which is lightweight and rugged, operates across a wide wavelength range, provides excellent stigmatic imaging, and is insensitive to thermal changes. The telescope does not produce an image plane, so that there is no internal location for a field stop. Note that if the lens 10 were used to project a collimated high peak-power laser, the lack of an internal focus helps avoid damage to the optical material.

By way of example, an afocal monolithic optical element as above was designed with a 15 cm aperture, 16 cm diameter and 5 cm thickness, low mass (approx. 1 kg) and compact form, for a 10:1 collimated beam reduction to make use of a particular pupil-steering mirror. The secondary obscuration 18 was formed by grinding a concave paraboloid into the mostly-flat front face 14 of the telescope. This surface had a base radius of curvature of −1.10 cm, and a conic constant of −1.00 (making it paraboloidal). The back surface is mostly configured with a radius of curvature of −11.00 cm and conic constant of −1.00, making a paraboloid to function as a telescopic primary mirror. Into the center of this surface a flat surface of 1.51 cm diameter was ground to form an unpowered interface through which the light can exit the optical element.

Figure 4:
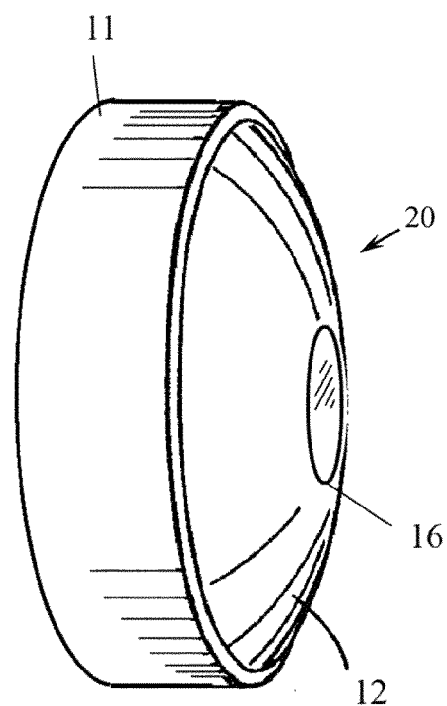
FIG. 4 is a rear perspective view of a Gregorian-type afocal monolithic optical element according to another embodiment of the invention.
Figure 5:
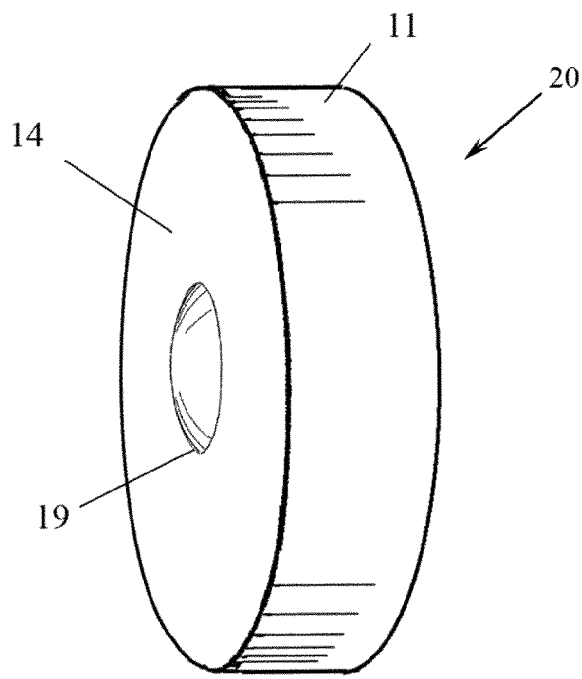
FIG. 5 is a front view of the Gregorian-type afocal monolithic optical element of FIG. 4.
Figure 6:
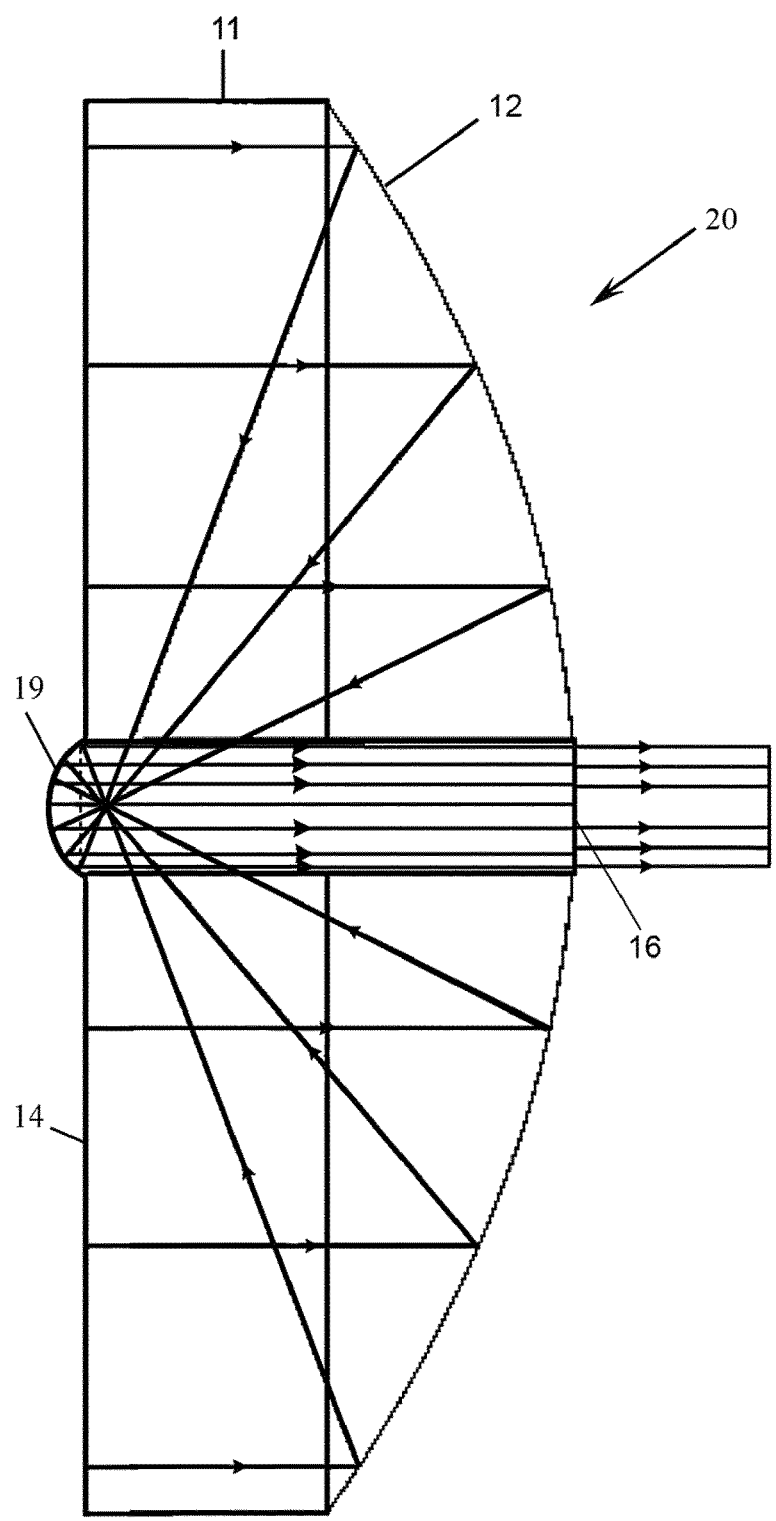
FIG. 6 is a diagrammatic view of the Gregorian-type afocal monolithic optical element illustrating its operation.

FIGS. 4-6 show another optical element 20, configured as a Gregorian-type telescope with positive primary and secondary mirrors, according to an alternate embodiment of the invention. In this example embodiment, a secondary reflector protrudes from the otherwise-flat front surface. This reflector has a radius of curvature of 1.10 cm, and a conic constant of −1.0 making the figure paraboloidal. The back surface of the element 20 has a base radius of curvature of −11.00 cm, and also is a paraboloid with conic constant of −1.0. The separation of the vertices of these two surfaces is 60.5 mm in this embodiment. All components in common with FIGS. 1-3 are similarly numbered, the difference being that in this embodiment the figured asphere secondary obscuration 19 is reversed, formed as a bump protruding from the otherwise flat front surface 14. Again, the figured aspheric portion of the front surface 19 is silvered, thereby forming the secondary mirror of the monolithic telescope. This Gregorian embodiment does have an internal focus, and thus provides a location for a field stop. It is envisioned that this configuration can be produced in two separate pieces, separated as shown by dotted line in FIG. 6. In this configuration, the optical system mass is approximately 0.3 kg more than the Cassegrainian-type element 10 in the example of FIGS. 1-3 described above, and the optical system is slight more than 1 cm thicker.

In both the above-described embodiments 10, 20, by using aspheric surfaces much faster (i.e. more steeply curved) optical surfaces are formed, significantly shortening the optical system and reducing the disadvantages of a solid-block cavity. Since all powered surfaces work in reflection, there is no chromatic aberration, and even high-dispersion materials such as plastics can be used. Since the entire element can be made of a monolithic block of material, thermal expansion simply changes the scale of the device without significantly altering its characteristics or performance. This again allows high-expansion polymers and plastics to be used. Finally, once figured, both powered surfaces 12, 14 are permanently aligned with respect to one another and this obviates the need for a support and metering structure, and eliminates the possibility of element misalignment.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. An afocal monolithic optical element including:
   a body of optically-transmissive material having front and rear faces;
   a substantially planar input surface on the front face;
   a secondary mirror defined in the front face, said secondary minor comprising an aspheric section at a center of said front face that is silvered for reflection;
   a substantially aspheric rear face;
   an exit aperture defined as a flat polished section on the rear face.

2. The afocal monolithic optical element according to claim 1, wherein the aspheric section of said secondary mirror comprises a paraboloid.

3. The afocal monolithic optical element according to claim 1, wherein the exit aperture is flat to provide an unpowered surface through which a collimated light beam can exit the lens.

4. The afocal monolithic optical element of claim 1, wherein said secondary mirror is recessed concave into said body of optical material.

5. The afocal monolithic optical element of claim 1, wherein said secondary mirror is protruded convex from said body of optical material.

6. The afocal monolithic optical element of claim 5, wherein said afocal monolithic optical element incorporates an internal field stop.

7. The afocal monolithic optical element according to claim 1, wherein the aspheric portion of the front face is coated for at least partial reflection.

8. The afocal monolithic optical element according to claim 7, wherein the substantially aspheric rear face is coated for at least partial reflection.

9. The afocal monolithic optical element of claim 8, wherein the flat portion of the rear face is coated with a filter coating.

10. The afocal monolithic optical element according to claim 7, wherein the substantially aspheric rear face comprises a paraboloid.

11. The afocal monolithic optical element according to claim 10, wherein the aspheric section of said secondary mirror and the substantially aspheric rear face comprise confocal paraboloids.

12. The afocal monolithic optical element of claim 7, wherein said substantially planar input surface on the front face is coated with a filter coating.

13. An afocal monolithic optical element including:
   a body of optical material having front and rear faces;
   a substantially planar surface on the front face;
   a section defined in the center of said front face as an aspheric section;
   a substantially aspheric rear face;
   a section defined in the center of said rear face as a flat section.

14. The afocal monolithic optical element of claim 13, wherein said aspheric section is recessed concave into said body of optical material.

15. The afocal monolithic optical element of claim 13, wherein said aspheric section is protruded convex from said body of optical material.

16. The afocal monolithic optical element of claim 13, wherein the aspheric section of said front face is silvered.

17. The afocal monolithic optical element of claim 13, wherein said rear flat section supports a spectrally selective filter formed by deposition of one or more dielectric and metallic films or by attachment of a separate spectrally selective filter.

18. The afocal monolithic optical element according to claim 13, wherein the aspheric section of said front face comprises a paraboloid.

19. The afocal monolithic optical element according to claim 18, wherein the substantially aspheric rear face comprises a paraboloid.

20. The afocal monolithic optical element according to claim 19, wherein the aspheric section and the substantially aspheric rear face comprise confocal paraboloids.

21. The afocal monolithic optical element according to claim 13, wherein the aspheric portion of the front face is coated for at least partial reflection.

22. The afocal monolithic optical element according to claim 21, wherein the substantially aspheric rear face is coated for at least partial reflection.

23. The afocal monolithic optical element of claim 22, wherein the flat section of the rear face is coated with a filter coating.

24. The afocal monolithic optical element of claim 21, wherein said substantially planar surface on the front face is coated with a filter coating.

\* \* \* \* \*